No. 736,698.                                                         Patented August 18, 1903.

UNITED STATES PATENT OFFICE.

ALONZO P. CUTHRIELL, OF PORTSMOUTH, VIRGINIA, ASSIGNOR, BY DIRECT AND MESNE ASSIGNMENTS, TO DOLPHIN PAINT COMPANY, OF PORTSMOUTH, VIRGINIA, A CORPORATION OF VIRGINIA.

ANTIFOULING COMPOSITION.

SPECIFICATION forming part of Letters Patent No. 736,698, dated August 18, 1903.

Application filed September 12, 1902. Renewed July 15, 1903. Serial No. 165,658. (No specimens.)

*To all whom it may concern:*

Be it known that I, ALONZO P. CUTHRIELL, a citizen of the United States, residing at Portsmouth, in the county of Norfolk and State of Virginia, have invented new and useful Improvements in Antifouling Composition, of which the following is a specification.

This invention relates to a certain new and useful paint composition, more particularly of that class of compositions designated as "antifouling paint compositions."

The invention aims to provide an antifouling composition particularly adapted for covering ships' bottoms to prevent the same from fouling—that is to say, to prevent the adhering thereto of barnacles or other matters which cause the bottoms of the vessels to become foul.

The composition consists of the following ingredients: dry bright Venetian red, ten and one-fourth pounds; shellac varnish, four and one-fourth gallons; raw linseed-oil, three and one-half pints; red precipitate of mercury, three pounds; arsenious acid, one pound.

The foregoing ingredients are suitably combined together in the proportions specified, and when combined an antifouling composition is obtained particularly adapted for painting ships' bottoms and which will prevent the adhering of marine bodies thereto and overcoming the fouling of the bottoms.

It is thought the many advantages obtained from an antifouling composition formed from the ingredients hereinbefore specified can be readily understood, and it will also be noted that various minor changes as to the specified proportions of the ingredients, or the use of an equivalent thereof, can be made without departing from the general spirit of the invention, which consists in suitably forming an antifouling composition as set forth in the protection prayed.

Having thus fully described my invention, what I claim as new is—

An antifouling composition consisting of Venetian red, shellac varnish, raw linseed-oil, a precipitate of mercury, and arsenious acid.

In testimony whereof I have hereunto set my hand in presence of two subscribing witnesses.

ALONZO P. CUTHRIELL.

Witnesses:
 N. L. BOGAN,
 GEO. W. REA.